Aug. 19, 1930.   S. E. MEYERS   1,773,110
STOP VALVE
Filed Aug. 6, 1925
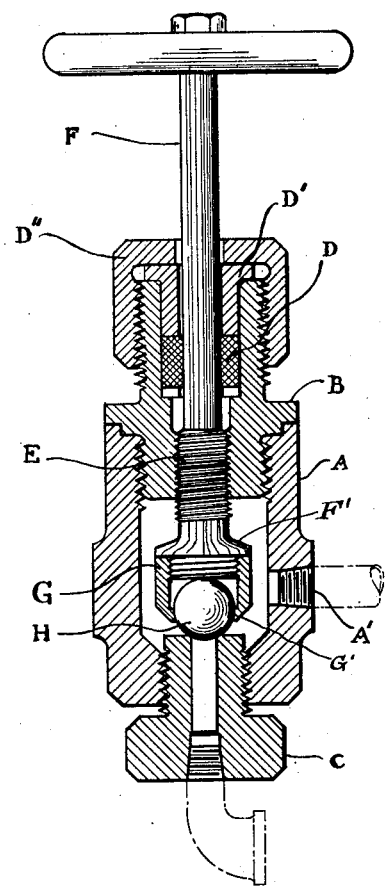
INVENTOR
SIDNEY E. MEYERS
BY *William J. Wardlaw*
ATTORNEY Patented Aug. 19, 1930

1,773,110

UNITED STATES PATENT OFFICE

SIDNEY E. MEYERS, OF BUFFALO, NEW YORK, ASSIGNOR TO NATIONAL ANILINE & CHEMICAL CO., INC., OF NEW YORK, N. Y., A CORPORATION OF NEW YORK

STOP VALVE

Application filed August 6, 1925. Serial No. 48,508.

This invention relates to stop valves and in particular to valves for use with high pressures.

For high pressures, accuracy in fit between the closure elements is necessary to avoid leakages. The same condition makes ready access to the wearing parts desirable so that they may be replaced as occasion requires without undue losses.

Accordingly, an object of this invention is a valve closure that is accurately fitted and yet inexpensive. A further object is a valve structure having a wear taking element that is removable without dismantling the valve. In addition, the invention has for an object a valve structure which provides flexibility in connection and avoids the imposition of limitations on piping arrangements.

In the drawing the figure is a cross-section of a valve showing an embodiment of my invention.

A hollow body A is of cylindrical or other shape with open ends, and has a removable bonnet B in screw engagement with one end and a removable valve seat C having an extended screw engagement with the other end to withstand high pressure. Within the bonnet B is a usual packing D forced into tight contact with a valve stem F by a follower D' and an internally threaded sleeve D'' engaging an externally threaded continuation of the bonnet. The stem F has a screw engagement E with the bonnet and carries a sleeve G on its interior threaded end, which sleeve has an inwardly extending flange or lip G' loosely restricting and supporting a ball valve H within the sleeve. A shoulder or flange F' on the stem F limits the extent to which the sleeve G can be turned upon the threaded end and thus binding of the ball valve is avoided; it also supplies an extended surface contact with the sleeve G to frictionally engage the latter and prevent unscrewing of the sleeve. The end face of the stem contacts with the ball to force it on the seat. The ball or closure H is preferably a commercial bearing ball which is of hard metal and has an accurate configuration. The seat C with which the ball cooperates is preferably of softer metal than the ball to take up the wear, and the seat has an opening extending therethrough that is tapped for connection with a pipe line as shown.

The valve body A has a thickened annular portion as shown so that an opening, such as A' which is tapped for a pipe connection, has sufficient engaging surface to withstand the high pressures for which the valve is designed. The opening A' may be made in any generally lateral direction, i. e., perpendicular or inclined to the body axis, and bends in the pipe line in which the valve is mounted can thus be reduced to a minimum.

With this construction, the valve seat C may be readily removed without disturbing the valve body connection with the piping, the valve mechanism can be also removed without disturbing the connections between the valve body and the piping, and the valve body may be tapped as desired without interfering with the valve structure or its operation, since the valve elements are supported from the two ends of the body. The selection of a bearing ball and a seat of softer metal assures a fit that is gas tight under high pressures although inexpensive and readily assembled, and the softer metal seat provides that the wear between these closure elements is taken up by the readily removed seat.

I claim:

1. A high pressure valve comprising in combination a hollow body having a thickened portion for tapping in any generally lateral direction to constitute a pipe connection with sufficient engaging surface to withstand high pressures, a separable valve seat carried by said body and provided with a pipe connection, a valve stem movably mounted in said body, a sleeve having a screw engagement with the interior end of said stem, and a ball closure adapted to cooperate with said seat loosely mounted in and projecting from said sleeve.

2. A high pressure valve comprising in combination a hollow body having a thickened portion for tapping in any generally lateral direction to constitute a pipe connection with sufficient engaging surface to withstand high pressures, a valve seat mounted at one end of said body and removable therefrom without disturbing a pipe and body connection, said seat having an opening therethrough and a pipe connection, a valve stem movably mounted at the other end of said body, said stem having its interior end threaded, a sleeve engaging the threaded end of said stem, a ball closure within the sleeve, an internally extending flange on the sleeve for retaining said closure within the sleeve, and a flange on said stem in contact with said sleeve.

3. A valve for high pressure fluid systems comprising in combination a valve body centrally apertured and having a thickened portion adapted to be tapped in any generally lateral direction for a pipe connection, a valve seat centrally apertured and adapted to be inserted into one end of said valve body, said valve seat having a pipe connection, a bonnet adapted to be inserted into the other end of said valve body, a screw connection between said bonnet and said valve body, and a valve mechanism cooperating with said seat comprising a valve stem having a screw connection with said bonnet and a ball valve removably mounted on the interior end of said valve stem, said bonnet and valve mechanism being removable from said body without disturbing a pipe and body connection.

In testimony whereof I affix my signature.

SIDNEY E. MEYERS.